April 18, 1933.  E. KENNEDY  1,904,688

TESTING DEVICE FOR WATER SYSTEMS

Filed Sept. 20, 1930

Inventor
Edward Kennedy

By C. P. Gospel,
Attorney

Patented Apr. 18, 1933

1,904,688

UNITED STATES PATENT OFFICE

EDWARD KENNEDY, OF NEW YORK, N. Y.

TESTING DEVICE FOR WATER SYSTEMS

Application filed September 20, 1930. Serial No. 483,362.

The present invention relates to improvements in testing devices for water systems, and has for an object to provide certain improvements over the testing device for water systems described and shown in my prior Patent No. 1,155,821, granted October 5, 1915.

It is another object of the invention to provide an improved testing device which is temporarily secured in the pipe joint and which, besides performing its customary testing functions will furthermore act as a stop and support for the interfitting pipe section, acting to bring this pipe section to a correct position and for retaining it in such correct position during the filling of the joint.

A further object of the invention resides in providing an improved testing device, which will act as a stop and support for the pipe during the jointing operation, and which subsequent to its removal will allow ample space for the longitudinal expansion and contraction of the interfitting pipe section.

With the foregoing and other objects in view, the invention will be more fully described hereinafter, and will be more particularly pointed out in the claim appended hereto.

In the drawing, wherein like symbols refer to like or corresponding parts throughout the several views, Figure 1 is a vertical section taken through a pipe joint with the improved testing device.

Figure 1:
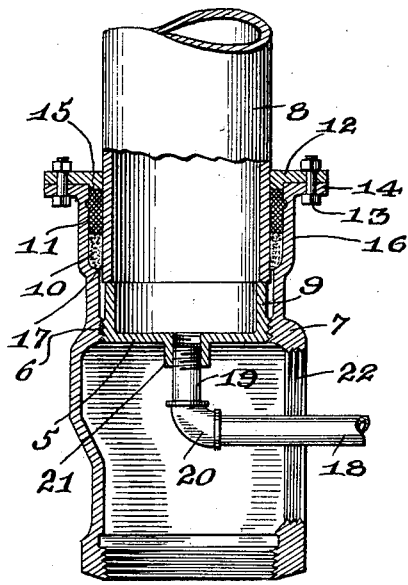

Referring more particularly to the drawing 5 designates a temporary testing plug, which is provided with external screw threads to threadedly engage the internal threads 6 upon pipe union 7. The arrangement is such that the testing plug 5 may be screwed up into its place in the union and removed downwardly therefrom after the pipe section 8 has been put in place.

The upper end of the testing plug flange 9 constitutes a stop and support for the end of the inserted pipe section 8, while the joint connection is being packed. This joint may include for instance the lead packing 11 and the waste or fiber 10. The packing is confined in place as by the use of a cap plate 12 removably secured in place by bolts or other fastenings 13 passing through the plate 12 and through an out-turned flange 14 on the pipe union 7. Preferably the plate is shouldered as indicated at 15 to fit within the pipe union whereby to center the same. The pipe union is enlarged, as at 16 to provide a packing gland or chamber and is constricted, as indicated at 17 for forming an inner end wall for this chamber. The inner end of the pipe section 8 is fitted into the constricted portion of the joint. A fluid testing pipe comprising a horizontal section 18 and a vertical section 19 united by an elbow 20 is shown as threaded in a depending boss 21 of the plug 5 and extending out through a threaded opening 22 of the joint member 7.

The packing referred to includes the usual calking.

Figure 2:
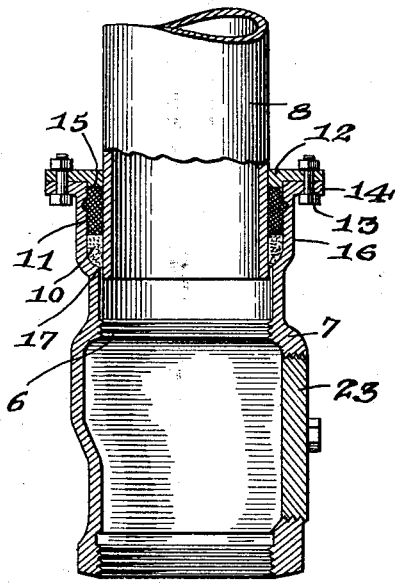
Figure 2 is a similar view with the testing device removed.

In the use of the device, the plug 5 is first put in place, the pipe section 8 is then fitted to the joint member 7 until the inner end comes in contact with the flange 9 which determines the correct position of the pipe section 8 and acts as a stop and a support therefor. The joint material is then filled, put in the chamber 16 and the plate 12 finally put in place and secured. After the system has been tested the plug 5 is removed and the space between the inner end of the pipe section 8 and the thread 6 gives ample room for longitudinal expansion of the pipe section. After the testing device is removed a plug 23 may be inserted in the opening 22, as indicated in Figure 2.

Figure 3:
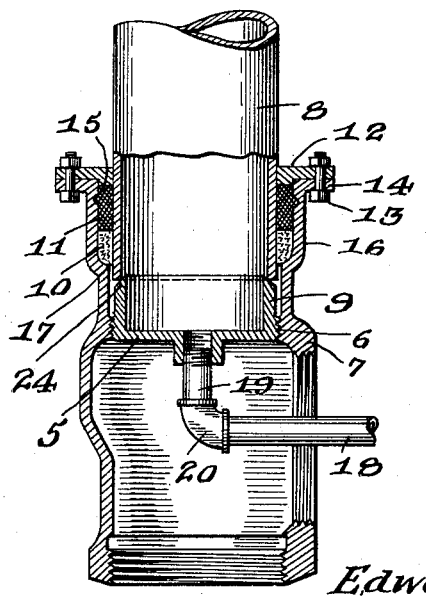
Figure 3 is a view similar to Figure 1 but showing a slight modification.

Referring to Figure 3 the parts are the same as explained in Figure 1 with the exception that the beveled end 24 is provided upon the flange 9 of the testing plug 5 which end engages the end of the pipe section 8. This beveled end will have a tendency to very accurately center the pipe section 8 and to bring the pipe section to a correct axial position before the operation of filling the joint is begun.

It will be noted that the unthreaded section of the wall or flange 9 of the testing device is spaced from the wall of the joint member to provide an annular chamber, and that the end of pipe 8 extends inwardly beyond packing 10. Thus, any leakage between the end of pipe 8 and the abutting end of the flange 9 is directed away from the packing and collects within the annular chamber between said flange and the wall of the joint member.

It is obvious that various changes and modifications may be made in the details of construction and design of the above specifically described embodiment of this invention without departing from the spirit thereof, such changes and modifications being restricted only by the scope of the following claim:—

What is claimed is:—

In a testing device for water systems, a joint member having an intermediate section of diametrically reduced diameter internally threaded at one end, the other end of said joint member being adapted to receive the end of a pipe projecting into the joint member beyond a packing gland between said pipe section and the wall of the joint member, said projecting end of the pipe section being spaced from the wall of said reduced section of the joint member, and a testing device of cup shaped form having external threads at one of its ends removably engaged with the threads of said reduced section of the joint member, and the unthreaded annular wall of said testing device being spaced from the wall of said reduced section of the joint member and adapted to abut against the end of said pipe section to support the latter during packing of the joint.

In testimony that I claim the foregoing as my invention, I have signed my name hereto.

EDWARD KENNEDY.